United States Patent

Thompson et al.

[11] 4,248,094
[45] Feb. 3, 1981

[54] MEASUREMENT OF RESIDUAL STRESSES BY LOCAL MELTING

[75] Inventors: Robert A. Thompson, Quaker Street; Hsin-Pang Wang, Scotia, both of N.Y.

[73] Assignee: General Electric Company, Schenectady, N.Y.

[21] Appl. No.: 37,872

[22] Filed: May 10, 1979

[51] Int. Cl.[3] .............................................. G01N 33/00
[52] U.S. Cl. ........................................ 73/760; 73/783
[58] Field of Search ................. 73/760, 783, 787, 15.6

[56] References Cited

U.S. PATENT DOCUMENTS 3,696,504  10/1972  Cupler et al. ......................... 29/558
3,765,230  10/1973  Bohm et al. ........................... 73/783

OTHER PUBLICATIONS

"Simplification of the Hole-Drilling Method of Residual Stress Measurement" by Bush et al., ISA Transactions, vol. 12, No. 3, pp. 249-258, 1973.

Primary Examiner—James J. Gill
Attorney, Agent, or Firm—Donald R. Campbell; Marvin Snyder; James C. Davis

[57] ABSTRACT

Residual stress measurements are made using a strain gage and stress relief achieved by local melting of a region of the object being tested by a laser beam or other focused heat source. Surface strain is measured after the molten region resolidifies, and the effect of thermal stress and recast stress is eliminated by subtracting a calibration measurement of an annealed specimen. The method is semi-nondestructive, less costly than existing techniques, and can be used to measure residual stress on the interior surface of pipes.

8 Claims, 6 Drawing Figures

MEASUREMENT OF RESIDUAL STRESSES BY LOCAL MELTING

BACKGROUND OF THE INVENTION

This invention relates to a method of measuring bulk residual stress by a semi-nondestructive technique.

Residual stress is also known as internal stress and is defined as a stress system within a solid that is not dependent on external forces. The two key residual stress techniques in current use are the stress relief methods and the x-ray method. The first as traditionally practiced, such as by drilling or machining a hole in a specimen to relieve the stresses, is destructive. Efforts to measure residual stress nondestructively have met with little success except for the use of x-rays, but this is only applicable to within one-half mil of the surface and is not adaptable to measuring residual stress on the inside surface of a pipe or other internal surface.

A related application is Ser. No. 038,069 filed on May 11, 1979 by J. R. M. Viertl and M. G. Jones, "Semi-Nondestructive Residual Stress Measurement", assigned to the same assignee. In the foregoing surface strain is measured dynamically before the heat of a locally melted region diffuses under the strain gage and results in thermal stress. By semi-nondestructive it is meant that the damage to the part is so small that the part tested is not impaired for further service.

SUMMARY OF THE INVENTION

Residual stresses are determined from the measurement of surface strains which are caused by stresses relieved at a locally melted region of the object being tested which is in the vicinity of the strain gage. Local melting is realized by a laser beam or other finely directed heat souce, and a short heat pulse is used to limit the molten region and protect the strain gage. After the heat pulse stops, the molten region starts to resolidify. Thermal stresses are dissipated as the temperature decreases and the recast stress becomes dominant, and the change in strain causes by stress relaxation is now measured by relatively simple electrical circuitry. The effects of both thermal stress and recast stress are eliminated by subtracting a calibration measurement of an annealed specimen of the same material from the measurement of the object being tested. The resulting relief strain is used for the calculation of residual stresses.

The preferred implementation of the method employs a three-element rosette resistance strain gage and a hole is temporarily melted at the center of the rosette by a laser operated in pulse mode. The calibration measurement of strain on an annealed specimen is made by substantially identically duplicating the test made on the object, waiting a sufficient period of time after the hole resolidifies (10–30 seconds) for thermal and recast stresses to stabilize. Instead of hole melting, a stress relieved almost complete ring is melted around the gage's perimeter when a more accurate and sensitive technique is needed.

This method measures bulk residual stress, is semi-nondestructive because little material is lost, can be used in conjunction with optical components to deflect the laser beam to measure residual stress on the internal surface of pipes and other parts, and is less costly than existing techniques.

DESCRIPTION OF THE PREFERRED EMBODIMENTS

The present method for measuring residual stresses is based on the well-known hole drilling technique of residual stress measurements. Residual stresses are evaluated from the measurement of surface strains which are caused by stresses relieved at the hole. In this method, a hole is transiently melted in the object being tested in the immediate vicinity of a strain gage in order to relieve the stresses. Under some circumstances, the hole melting method may have insufficient sensitivity or accuracy, and the trepanning method can be used when a more accurate, more sensitive technique is needed. In this case, instead of making a hole in the center of a gage, a stress relieved ring or almost complete ring is melted around the gage's perimeter. The semi-nondestructive method is applicable to trepanning as well as hole melting, and to other locally melted region geometries.

Figure 1:
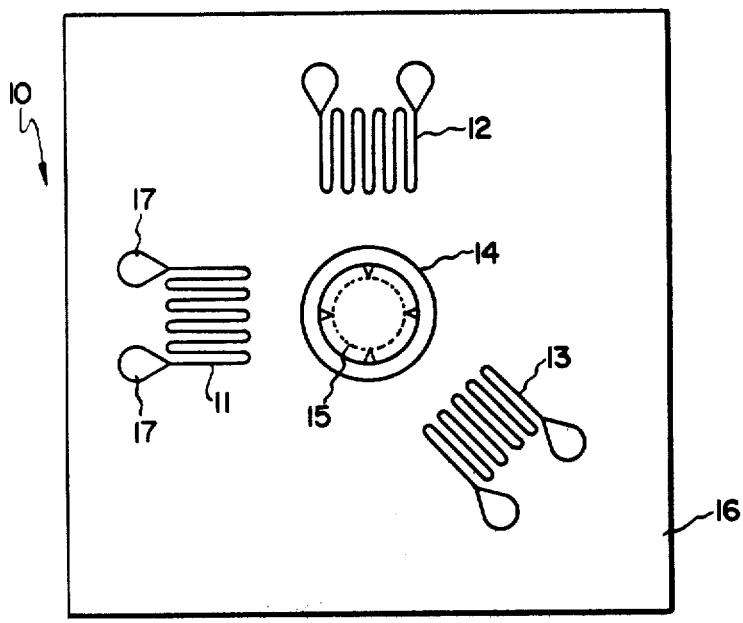
FIG. 1 is a plan view of a three-element rosette strain gage for hole melting.

The three-element rosette strain gage 10 shown in FIG. 1 is typically selected when the principal stresses and one principal direction are to be determined. The three gage elements 11, 12, and 13 are arranged on a gage circle and are oriented at 0°, 90°, and 225°. At the center of the gage, concentric with the gage circle, is an annular ring 14 which serves as an alignment pattern and within which a hole 15 is temporarily melted by an appropriate finely directed heat source. The pleated gage elements and the alignment pattern are etched foil components on a continuous plastic support 16 and are fabricated by printed circuit techniques. At either end of the gage element is an enlarged contact pad 17 for making electrical connections. Rosette gage 10 is a metallic resistance gage which operates such that when a length of foil is mechanically stretched, a longer length of smaller conductor results and the electrical resistance is normally increased. If the length of resistance element is intimately attached to a strained part in such a way that it will also be strained, then the measured change in resistance can be calibrated in terms of the strain. Many other strain gage configurations are known and may be substituted for the rosette gage, depending upon the application.

The locally melted hole or region 15 for stress relief is produced at the center of the gage by a focused laser or electron beam, or indeed by any heat source capable of delivering a finely directed short heat pulse. Of these, the laser is preferred and is operated in pulse mode with a pulse length of about 1–10 milliseconds. The short heat pulse limits the molten region and protects the strain gages, and it is also important to melt the metal or plastic object being tested without causing splattering. When the melting is properly controlled, the hole upon solidifying almost closes up. The semi-nondestructive nature of the method is realized because the molten region recasts in a few milliseconds before any significant amount of material is lost.

Figure 2:
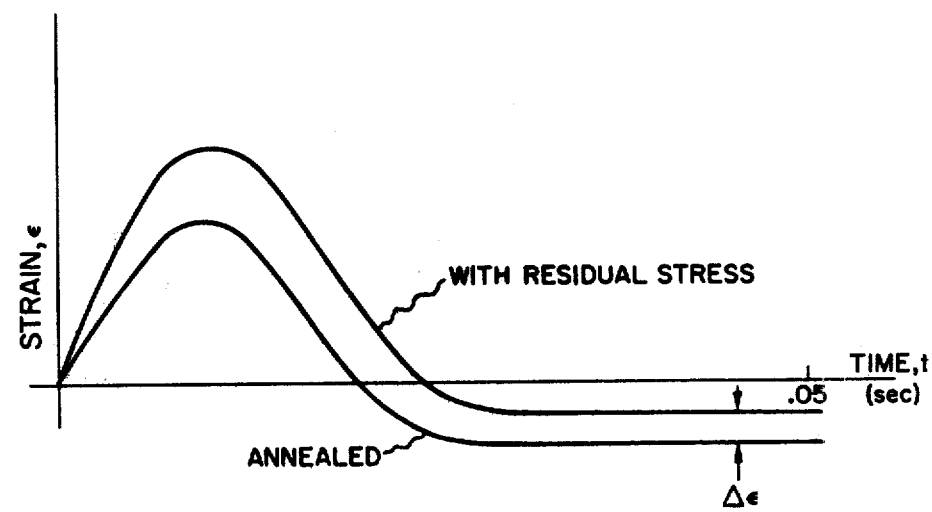
FIG. 2 is a plot of strain vs. time for an object with residual stress and an annealed calibration specimen.

The process for measuring residual stress by local melting is described as follows. Initially, the laser introduces energy into the object for a certain period of time, and a molten hole is formed and residual stress is relieved in its vicinity. At the same time, thermal stress is also introduced due to the nonuniform temperature distribution. After the laser pulse stops, the molten hole starts to resolidify. Thermal stresses are dissipated as the temperature decreases, and the recast stress becomes dominant. The change in strain caused by stress relaxation is measured after the melted region resolidifies and after a sufficient period of time, about 10-30 seconds, for thermal stresses and recast stresses to stabilize. The plot of strain vs. time in FIG. 2, referring to the curve for an object with residual stresses, shows that the peak magnitude of strain occurs while the region is molten and that the strain is substantially constant after a short period of time. The effect of both thermal stress and recast stress is eliminated when a calibration measurement of an annealed specimen is subtracted from the measurement of an object with residual stress. The annealed specimen must be of the same material as the object being tested, such as stainless steel, but need not be of the same shape (for example, one may be a pipe and the other a flat plate). An annealed piece is selected because it has no built-in residual stress and a stress-free measurement can be made. The calibration mesurement of strain is made by substantially identically duplicating the test made on the object. Referring to the curve of strain vs. time in FIG. 2 for the annealed specimen, the surface strain likewise is measured after the molten region solidifies and the effect of thermal and recast stresses has stabilized. The relief strain, $\Delta\epsilon$, is obtained by subtracting the strain for the annealed specimen from the strain for the object with residual stress, and is used for the calculation of residual stresses. In the biaxial stress field, three unknowns, two principal stresses and one principal direction, can be solved by putting three gages in different directions.

Figure 3:
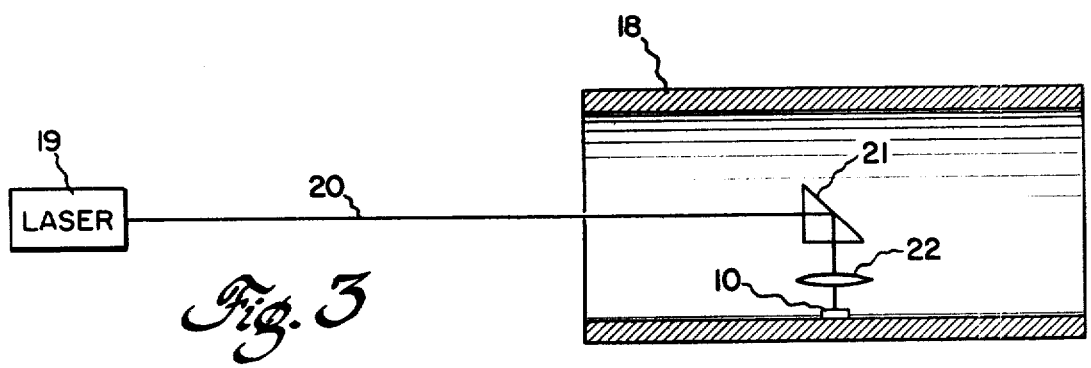
FIG. 3 is a cross section through reactor pipe showing a laser and optics for realizing local melting for residual stress measurment on the interior surface of the pipe.

The use of a remote, directed heat source permits residual stress measurements with difficult geometries such as an interior surface of a part. Referring to FIG. 3, one example is the measurement of residual stress on the ID (internal diameter) of a reactor pipe 18. Bulk welding residual stresses in nuclear piping play a major role in the intergranular stress errosion cracking problem, and since such cracking occurs on the internal surface of the pipe, it is here that the measurement must be made. Power laser 19 is at a remote location and laser beam 20 after entering the pipe is deflected by a prism 21 through focusing lens 22 onto the center of bonded rosette gage 10. The laser heat source and optical components for deflecting the beam, which may include mirrors, can be mounted on a movable carriage. The semi-nondestructive method is fast, less costly than existing methods, and lends itself to field measurements of residual stress.

Figure 4:
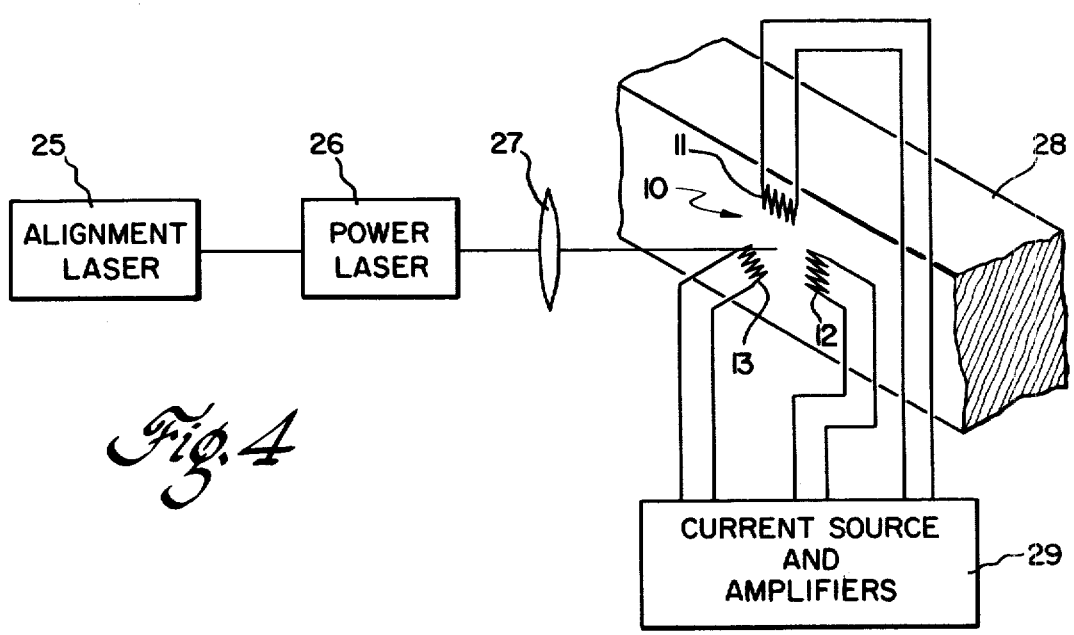
FIG. 4 is a schematic block diagram of a laser-strain measurement system.

In FIG. 4 is given the block diagram of a complete laser-strain measurement system. The laser subsystem includes an alignment laser 25, a power laser 26, and a focusing lens 27, and may be purchased components. The low power alignment laser in one subsystem is a helium-neon laser that is mounted on a common axis with the power laser, which is a neodymium-glass laser with a wavelength of 1.06 microns. The alignment laser has a different wavelength in the red region and assures that the power laser heat source pulse is at the center of the gage. Gage 10 is the same as in FIG. 1 and may be a commercially available hole-drilling rosette strain gage. These gages are relatively small with an overall dimension of one-quarter inch or less and are bonded to the object or specimen 28 with an appropriate adhesive. The change in strain after laser melting is measured by electrical circuitry including a current source and amplifiers 29. A constant current is fed to each gage element and the measured voltage across the element is directly proportional to strain, which in turn is proportional to stress. Stress is determined from the strains measured by appropriate formulae which include the Poisson's ratio and modulus of elasticity, E, for the material. If it is assumed that pipe 18 is the object being tested and the bar 28 is the annealed specimen, the same gage is used for both tests, and the laser subsystem and pulse length and energy input of the laser pulse are duplicated. Having once determined the calibration measurement of strain for a given material, it is not necessary to repeat this procedure each time an object made of that material is tested. Further, the voltage representing the calibration measurement of the annealed specimen can be subtracted automatically by the equipment from the measured voltage for an object with residual stress. There are various ways of doing this which are evident to a person skilled in the art.

Knowing the three relief strains, $\Delta\epsilon$, for the rosette gage configuration, the calculation of stresses and the magnitude of the principal stresses and their directions is a routine matter. Refer to "Hole-Drilling Strain-Gage Method of Measuring Residual Stresses", N. G. Rendler and I. Vigness, Experimental Mechanics, December 1966, pages 577-586; and to the book "Mechanical Measurements", Second Edition, T. G. Beckwith and N. L. Buck, Addison-Wesly Publishing Company, Inc. 1973, Library of Congress Catalog Card No. 70-85380. Alternatively, a microprocessor is presented with the three voltages representing relief strain and performs the computation of the principal stresses and their directions. This technique measures bulk residual stress, i.e., average stress to 50 or more mils depth from a surface.

Figure 5:
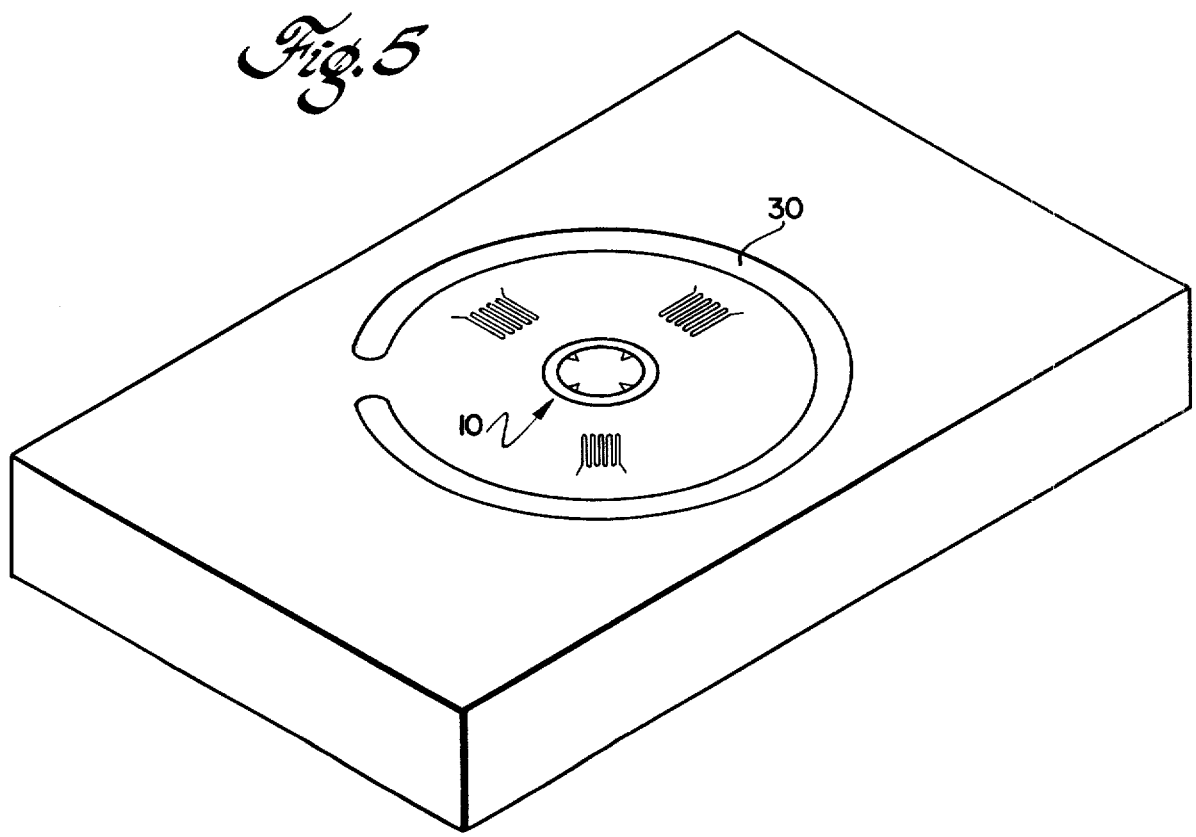
FIG. 5 depicts an almost complete ring-shaped melted region for stress relief.

The previously mentioned trepanning method is illustrated in FIG. 5 and is available when a more accurate and sensitive technique is needed. In this case, instead of making a hole in the center of the gage, a stress relieved almost complete ring-shaped region 30 is melted around the gage's permimeter. A finely focused laser beam is deflected to trace out the almost complete ring, leaving space for passage of leads to the gage elements.

While the invention has been particularly shown and described with reference to several preferred embodiments thereof, it will be understood by those skilled in the art that various changes in form and details may be made therein without departing from the spirit and scope of the invention.

The invention claimed is:

1. A semi-nondestructive method of making surface strain measurements on an object for determination of residual stresses comprising the steps of:
   attaching a strain gage to the surface of the object being tested,
   temporarily locally melting a region of the object in the immediate vicinity of the strain gage with a finely directed heat source to thereby relieve the stresses, measuring the change in strain caused by stress relaxation after the melted region resolidifies and after a sufficient period of time for thermal stresses to substantially dissipate and for recast stresses to become dominant, and subtracting from the measured strain of the object being tested a calibration measurement of strain on an annealed specimen of the same material as the object being tested and made by identically temporarily locally melting a region in the immediate vicinity of a strain gage with a finely directed heat source, and measuring the change in strain caused by stress relaxation after the melted region resolidifies and after a sufficient period of time for thermal stresses to dissipate and for recast stresses to become dominant.

2. The method of claim 1 wherein said heat source is a focused laser beam pulse having a pulse length of about 1-10 milliseconds.

3. The method of claim 2 wherein the laser beam is deflected to direct the beam onto an interior surface of the object being tested.

4. The method of claim 1 wherein said heat source is a focused laser beam which is deflected to direct the beam onto an interior surface of the object being tested.

5. A semi-nondestructive method of making surface strain measurements on an object for determination of residual stresses comprising the steps of:
attaching a multielement rosette resistance strain gage to the surface of the object being tested and to the surface of an annealed specimen of the same material,
temporarily locally melting a hole in the object and in the annealed specimen at the centers of the respective rosette gages with a focused laser beam to thereby relieve the stresses,
measuring the change in strain caused by stress relaxation for both the object and annealed specimen after the molten region resolidifies and after a sufficient period of time for thermal stresses and recast stresses to stabilize, and
subtracting the calibration measurement of strain for the annealed specimen from the measurement of strain for the object to obtain a value of relief strain to be utilized in determining residual stresses.

6. The method of claim 5 wherein the laser is operated in pulse mode with a pulse length between 1-10 milliseconds.

7. The method of claim 6 wherein the laser beam is deflected by optical components to direct the beam onto the interior surface of the object being tested.

8. A semi-nondestructive method of making surface strain measurements on an object for determination of residual stresses comprising the steps of:
attaching a multielement rosette resistance strain gage to the surface of the object being tested and to the surface of an annealed specimen of the same material,
temporarily locally melting an almost complete ring in the object and in the annealed specimen around the perimeters of the respective rosette gages with a focused laser beam to thereby relieve the stresses,
measuring the change in strain caused by stress relaxation for both the object and annealed specimen after the molten region resolidifies and after a sufficient period of time for thermal stresses and recast stresses to stabilize, and
subtracting the calibration measurement of strain for the annealed specimen from the measurement of strain for the object to obtain a value of relief strain to be utilized in determining residual stresses.

* * * * *